(12) United States Patent
Gilg et al.

(10) Patent No.: US 8,515,039 B2
(45) Date of Patent: Aug. 20, 2013

(54) METHOD FOR CARRYING OUT A VOICE CONFERENCE AND VOICE CONFERENCE SYSTEM

(75) Inventors: Virginie Gilg, München (DE); Siegfried Hartmann, Kranzberg (DE); Tobias Kleemann, München (DE); Walter Schmid, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1213 days.

(21) Appl. No.: 12/309,713

(22) PCT Filed: Jul. 28, 2006

(86) PCT No.: PCT/EP2006/007494
§ 371 (c)(1),
(2), (4) Date: Jan. 27, 2009

(87) PCT Pub. No.: WO2008/011901
PCT Pub. Date: Jan. 31, 2008

(65) Prior Publication Data
US 2010/0061536 A1 Mar. 11, 2010

(51) Int. Cl.
*H04L 12/18* (2006.01)
(52) U.S. Cl.
USPC .................................. 379/202.01; 370/260
(58) Field of Classification Search
USPC .................................. 379/202.01; 370/260
See application file for complete search history.

(56) References Cited

U.S. PATENT DOCUMENTS

| 6,697,342 B1 | 2/2004 | O'Connell | |
|---|---|---|---|
| 6,940,826 B1* | 9/2005 | Simard et al. | 370/260 |
| 2002/0126626 A1* | 9/2002 | Singh et al. | 370/260 |
| 2003/0063574 A1* | 4/2003 | Virolainen | 370/260 |
| 2005/0207357 A1* | 9/2005 | Koga | 370/260 |

FOREIGN PATENT DOCUMENTS

| EP | 1113657 A2 | 7/2001 |
|---|---|---|
| EP | 1298906 B1 | 3/2006 |

* cited by examiner

*Primary Examiner* — Ahmad Matar
*Assistant Examiner* — Jirapon Intavong
(74) *Attorney, Agent, or Firm* — Buchanan Ingersoll & Rooney PC

(57) ABSTRACT

A method and a voice conference system for carrying out a voice conference are disclosed, the system having at least three voice terminals in a communication system. At least one of the voice terminals is associated with a first group such that the voice data provided by the respective receiving channels thereof is decoded into individual voice signals for said group. Said individual voice signals are superimposed to form an aggregate voice signal and the aggregate voice signal is encoded into first aggregate voice data. Furthermore, at least two of the voice terminals are associated with a second group such that the second group has only voice terminals wherein an extensive inactivity on the respective receiving channels thereof is identified. The first aggregate voice data is supplied to the voice terminals associated with the second group by the respective receiving channels for a respective output of the first aggregate voice data.

16 Claims, 5 Drawing Sheets

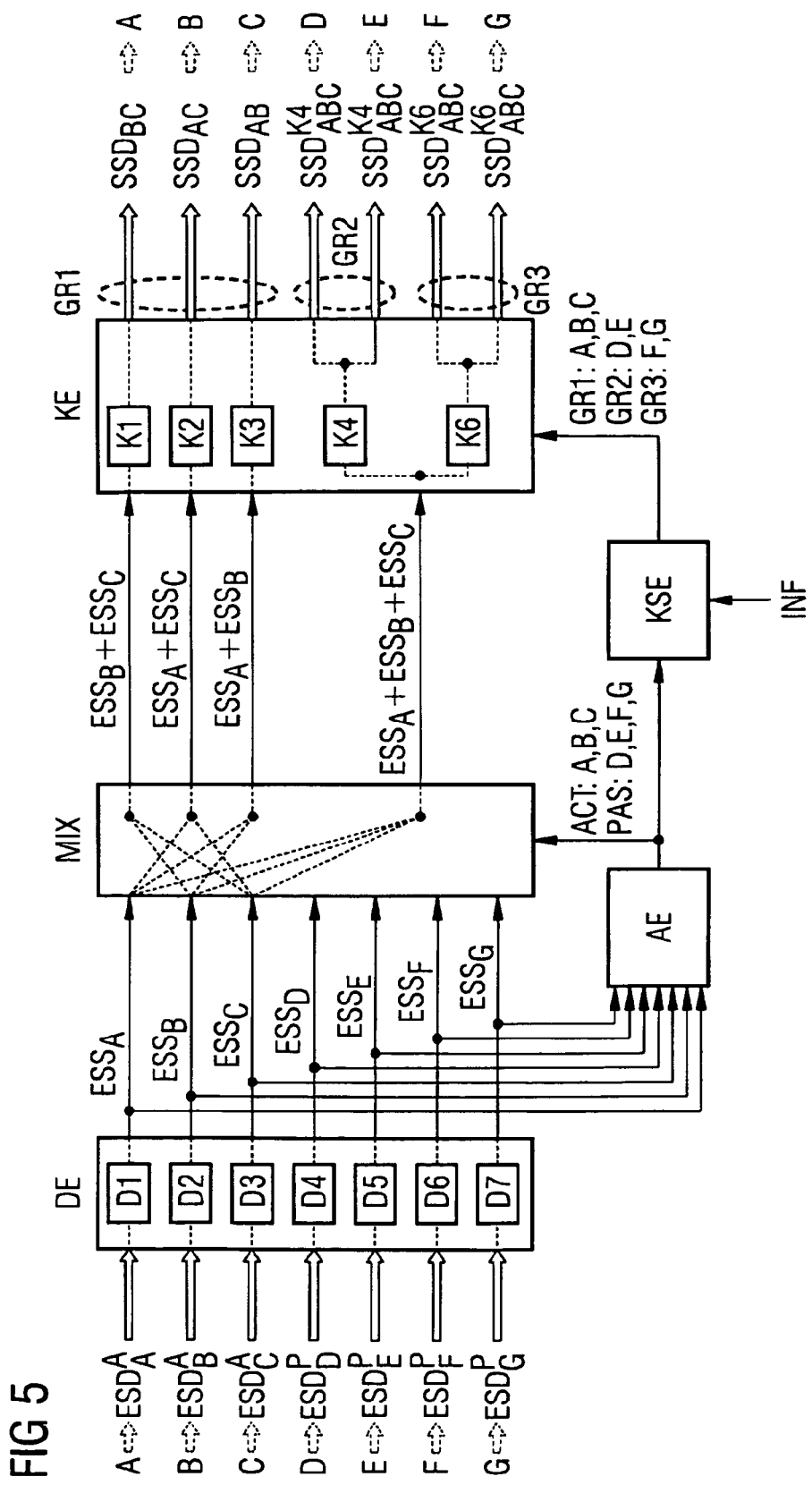

US 8,515,039 B2

METHOD FOR CARRYING OUT A VOICE CONFERENCE AND VOICE CONFERENCE SYSTEM

CROSS REFERENCE TO RELATED APPLICATIONS

This application is the US National Stage of International Application No. PCT/EP2006/007494 filed Jul. 28, 2006 and claims the benefit thereof and is incorporated by reference herein in its entirety.

FIELD OF INVENTION

The invention relates to a method for carrying out a voice conference and a voice conference system.

BACKGROUND OF INVENTION

Voice conference systems allow a number of voice terminals to be connected together for a telephone conference, so that the audio signals recorded by way of respective microphones of the voice terminals of the other participants can be supplied to a respective participant as a mixed signal for audio output. The mixed signal for a participant here is a superimposition of all the audio signals applied but without the audio signal of the participant, as said participant does not need to or should not hear his/her own spoken contributions to the conference him/herself, as this would bring about a sort of unwanted echo effect of his/her own utterances. Therefore for each of the N participants in a telephone conference a specific mixed signal must be formed, in which the (N-1) voice signals of the other participants in the telephone conference are processed to form the specific mixed signal.

For example in packet-based communication systems with voice terminals, which communicate by means of packet-based methods by way of a packet-based—for example IP-based (IP: Internet Protocol)—network, audio signals recorded by way of a microphone are converted by means of a coder into data packets for the packet-based network and data packets from the packet-based network are converted by means of a decoder into audio signals for an audio output by way of a speaker, which is for example located in a telephone receiver. A combined coding and decoding unit is generally referred to as a CODEC (Coding/Decoding). Known coding methods have been standardized for example by the ITU-T (ITU-T: Telecommunication Standardization Sector of the ITU; ITU: International Telecommunication Union). These are for example the CODECs G.711, G.726 or G.729. These CODECs differ in particular in respective voice quality, respective compression rate and the respective complexity of the coding method. For example the CODEC G.729 is characterized in that it can be deployed for a high level of compression with comparatively good voice quality, it being necessary to carry out computation-intensive operations however.

Voice terminals frequently support a number of CODECs, with a common CODEC being negotiated for a connection and/or a sub-section of a connection for the respective communication partners.

In order to connect voice terminals together by way of a telephone conference, the procedure is generally such that coded voice data arriving from the voice terminals is decoded in the voice conference system, a mixed signal is generated respectively therefrom for the respective voice terminals and the mixed signal generated in each instance is converted using a coder that is suitable for the respective voice terminal. The respectively resulting mixed voice data is then transmitted to the respective voice terminals for a respective voice output by means of packet-oriented methods.

This means that for a telephone conference with N participants the voice conference system decodes N incoming voice data streams simultaneously and the N mixed signals then formed are converted by means of N coders into N outgoing voice data streams. This can result in a significant computation outlay for coding and decoding, particularly in the case of telephone conferences with a large number of participants. Also a large number of coders and decoders has to be kept available in order to support telephone conferences with a large number of participants as well.

To reduce the complexity of coding and decoding, provision can be made in voice conference systems for only CODECs requiring little computation power to be used. But such less computation-intensive CODECs largely prove to be disadvantageous in respect of voice quality and/or the bandwidth required to transmit the coded voice data.

Alternatively—and to resolve the problem of high computation outlay—a voice conference system can dispense with decoding and mixing the decoded signals, in that the coded voice data from the respective voice terminals is forwarded to all further voice terminals and only decoded and mixed in the voice terminals in each instance. Such a procedure however gives rise to other or further problems, as the bandwidth requirements in respect of the voice terminals rise significantly and provision has to be made for the voice terminals to be able to process incoming voice data streams in a parallel manner. This increases the complexity in the voice terminals considerably.

SUMMARY OF INVENTION

It is difficult with all the methods mentioned above to be able to serve a large number of participants by means of the voice conference system without the computation complexity in the voice conference system increasing too much and without the voice quality or transmission bandwidth being influenced in a significantly negative manner.

An object of the present invention is to specify a method and a voice conference system for carrying out a voice conference, with which the computation complexity for the coding of all voice signals is kept low even with a large number of conference participants.

This object is achieved by a method for carrying out a voice conference and by a voice conference system as claimed in the independent claims.

Advantageous embodiments and developments of the method are specified in the dependent claims.

With the method for carrying out a voice conference with at least three voice terminals in a communication system, the voice terminals—which are preferably provided for simultaneous, bidirectional communication—each have a receive channel and a recording channel. The receive channel is provided to receive coded voice data occurring during the voice conference for the outputting of voice signals formed by decoding the received voice data at the respective voice terminal. The recording channel is provided to supply coded voice data for the voice conference, with the voice data to be supplied being formed by means of coding from voice signals recorded at the respective voice terminal. In the method at least one of the voice terminals is assigned at least temporarily to a first group in such a manner that the voice data supplied by way of its respective recording channels is decoded respectively for it into individual voice signals, these individual voice signals are superimposed to form an aggregate voice signal and the aggregate voice signal is coded into first aggregate voice data. At least two of the voice terminals are also assigned at least temporarily to a second group in such a manner that the second group only comprises voice terminals, for which extensive inactivity is identified at their respective recording channels. The first aggregate voice data is supplied to these voice terminals assigned to the second group by way of their respective receive channels for respective outputting of the first aggregate voice data.

The method proves to be particularly advantageous when a single common aggregate voice signal is formed from a number of individual voice signals and the coded aggregate voice signal—i.e. the first aggregate voice data—is supplied to a number of voice terminals without specific modification. This means that only an individual voice signal—the aggregate voice signal—is coded, preferably by means of a common CODEC, with the result that the number of CODECs used simultaneously in the voice conference can be significantly reduced. If for example X inactive voice terminals are assigned to the second group, generally X CODECs would be deployed simultaneously to code terminal-specific voice data if the method were not used. If the method is used however only one CODEC has to be deployed. It is thus' possible to save X-1 CODECs, as correspondingly fewer CODECs are required. The number of CODECs required as a maximum for the maximum number of participants in a voice conference can be determined by experiment for example in preliminary trials for telephone conferences operating in a real environment.

It is clear from the above that on the one hand a voice conference system for carrying out the method can operate with fewer CODECs than there are participants in the voice conference and still provide all the participants with voice data. On the other hand the computation complexity in the voice conference system is reduced by the smaller number of simultaneously active CODECs—i.e. the aggregation of all simultaneously deployed CODECs over all the voice terminals in the voice conference or over all the voice terminals in all the voice conferences taking place simultaneously—so that either computation capacity can be saved or better quality CODECs can be used, with the latter in turn impacting positively on voice quality and transmission bandwidth taken up.

Superimposition of individual voice signals can be understood to mean aggregation of the individual voice signals and optionally also signal attenuation after aggregation. This last step can ensure that a maximum level cannot be exceeded by the aggregate voice signal. During superimposition the individual voice signals can also be adjusted to a common volume level, by weighting individual voice signals differently during superimposition.

In one advantageous embodiment of the invention the first group can be formed in such a manner that only voice terminals for which activity is identified at their respective recording channels are assigned to it. The first and second groups can this be kept disjoint. This is advantageous in so far as only active individual voice signals have to be considered when forming the superimposition. The number of individual voice signals to be superimposed and therefore also the complexity of the superimposition are reduced as a result. The voice quality of the superimposed aggregate voice signal is also improved, as voice signals which contain—generally interfering—background noise but otherwise show no activity at all are not included in the aggregate voice signal and are therefore implicitly filtered out.

Alternatively in a further advantageous embodiment of the invention the first group can be formed in such a manner that largely inactive or all the voice terminals in the voice conference are also assigned to the first group. This means that no preliminary checks have to be carried out on the individual voice signals for activity/inactivity, with the result that delays can be avoided when implementing the method. In this embodiment the aggregate voice signal also comprises inactive individual voice signals, which are characterized by extensive inactivity, with the active voice terminals being dominant, so that the aggregate voice signal also fulfils the purpose of essentially being a superimposed signal of the active voice terminal.

The assignment or subdivision into first and/or second groups can take place dynamically according to one advantageous development of the invention. A first possibility is to check the group membership of the voice terminals after the end of regular or irregular time segments, by evaluating the activity of the voice terminal after the end of one of the time segments. According to the activity taking place at this time or according to the frequency and/or duration of activity during the time segment, those voice terminals with identified activity at the recording channel can be characterized as active speakers and assigned to the first group. Similarly if inactivity is identified at the recording channel the associated voice terminals can be characterized as passive listeners and grouped in the second group.

Additionally or alternatively it is possible to carry out new group reassignment triggered by an activity change—for example a switch from extensive inactivity to activity or vice versa—at one of the recording channels or triggered by a user action at one of the voice terminals. A user action can for example be key activation at one of the voice terminals, indicating that a respective participant wishes to participate actively in the voice conference. Alternatively the user interaction can be carried out by a moderator of the voice conference to grant speaking rights to individual participants.

In a further advantageous embodiment of the invention a third group can be formed, which like the second group only comprises voice terminals, which show extensive inactivity at their recording channels. Preferably a different coder is deployed respectively for the second and third groups to code the aggregated voice signals, which are supplied in the same manner, so that coded first aggregate voice data is supplied to the voice terminals of the second group by way of a first coder, while coded second aggregate voice data is supplied to the voice terminals of the third group by way of a second coder. The groups can therefore be formed for example in such a manner that voice terminals supporting CODEC G.729 are assigned to the second group, while G.711 supporting voice terminals are grouped in the third group. This means that the best quality CODEC of a respective voice terminal is used in each instance. Preferably the second and third groups are disjoint so that a voice terminal assigned to one of these two groups receives only the first or alternatively only the second aggregate voice data, with a voice terminal that supports more than one CODEC preferably being assigned to the group that allows the outputting of the best quality output signal and/or the smallest bandwidth load due to transmission of the respective aggregate voice data.

The advantages, developments and embodiments listed above apply both to the method and in a similar manner to the voice conference system.

BRIEF DESCRIPTION OF THE DRAWINGS

An exemplary embodiment of the invention is described in more detail below with reference to a drawing, in which:

FIG. 1 shows a communication system with a voice conference server and voice terminals participating in a voice conference and FIGS. 2-5 show components of the voice conference server and a logical signal and data flow between these components in the context of a voice conference in respectively different method phases.

DETAILED DESCRIPTION OF INVENTION

Figure 1:
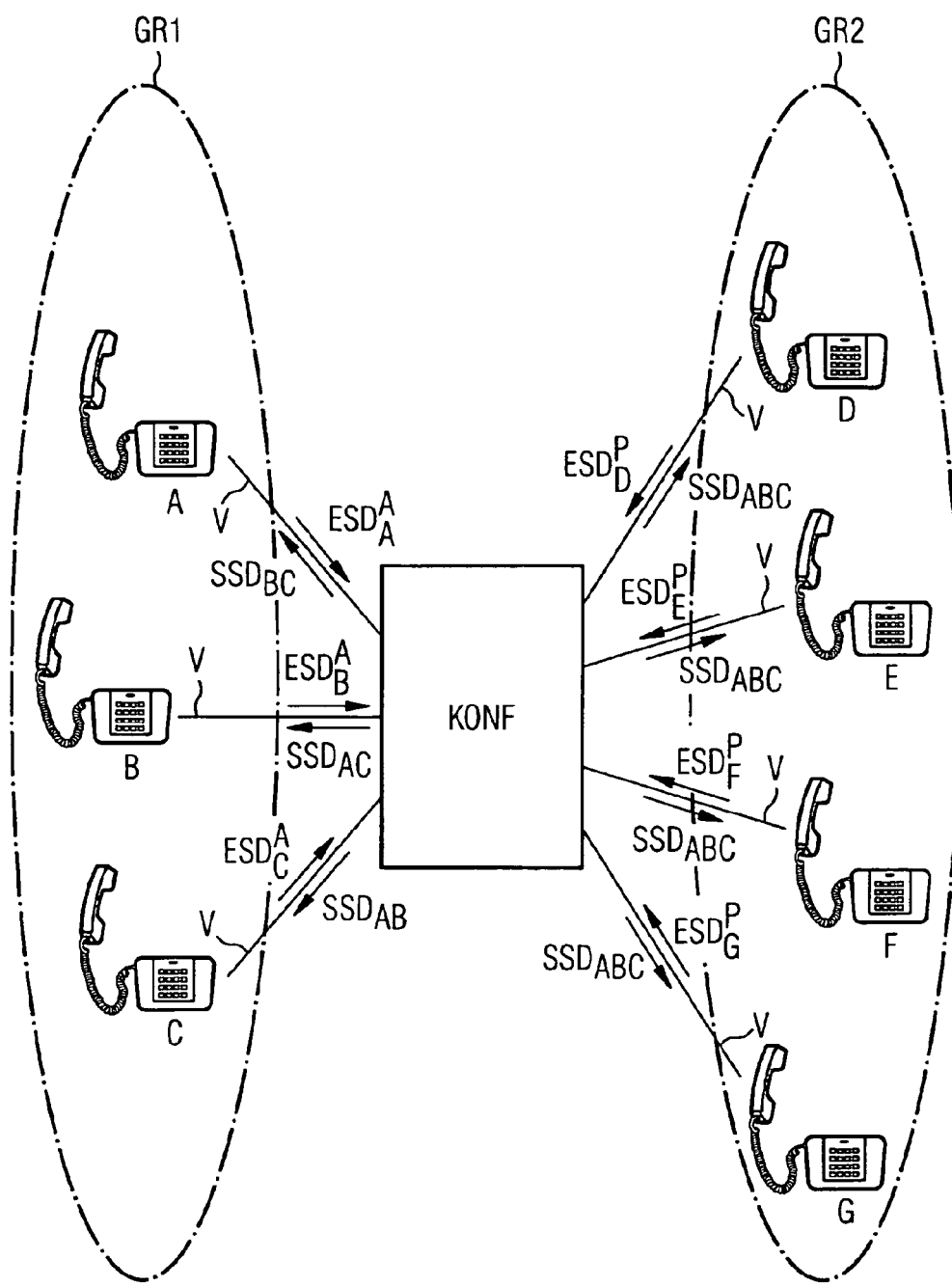

FIG. 1 shows a schematic diagram of a communication system with a voice conference system KONF and a number of voice terminals A, B, C, D, E, F and G. The voice conference system KONF and the voice terminals A, B, C, D, E, F, G are based here in the present exemplary embodiment on packet-oriented principles, with an IP-based transmission network (not shown in detail) being provided to transmit voice and signaling. The coupling of the voice terminals A, B, C, D, E, F, G to the voice conference system KONF is shown in FIG. 1 respectively by a connection V between the respective voice terminal A, B, C, D, E, F, G and the voice conference system KONF.

It is assumed in FIGS. 1 to 5 that a voice conference is already set up by way of the voice conference system KONF and a connection setup phase is already completed. All the above-mentioned voice terminals A to G are participating in this voice conference.

In the initial situation shown in FIG. 1 in the voice conference KONF the voice terminals A, B and C are active in respect of transmitted voice, while the voice terminals D, E, F and G are inactive. This subdivision is shown in FIG. 1 by the ellipsoid representation of a first and second group GR1 and GR2, with the ellipse for GR1 enclosing the voice terminals A, B, C and the ellipse for GR2 enclosing the remaining voice terminals D, E, F, G. Voice data streams passing by way of the connections V are shown in FIG. 1 by directional arrows, with voice data streams transmitted from the respective voice terminals A, B, C, D, E, F, G to the voice conference system KONF being shown as individual voice data ESD, while voice data streams transmitted from the voice conference system KONF to the respective voice terminals A, B, C, D, E, F, G are shown as aggregate voice data SSD, Whether a participant at one of the voice terminals A, B, C, D, E, F, G participates actively or just passively in a voice conference is indicated at the reference character ESD by a superscript A for active or a superscript P for passive (giving the reference character $ESD^A$ or $ESD^P$). The respective voice terminal A, B, C, D, E, F, G generating the respective individual voice data ESD is shown at the reference character ESD by the subscript letter of the voice terminal A, B, C, D, E, F, G. Thus for example a passive data stream of individual voice data from the voice terminal B is shown by the reference character $ESD^P_B$. As far as the aggregate voice data is concerned, the source data streams superimposing an aggregate voice data stream are shown at the respective reference character SSD. This is shown by subscripting the letters of the source voice terminals A, B, C, D, E, F, G. Thus for example aggregate voice data from the incoming data streams of the voice terminals A and B is shown as $SSD_{AB}$.

In the present example an analysis of the incoming voice data is carried out in the voice conference system KONF over a predetermined time period and it is analyzed in particular whether activity or inactivity of the respective voice terminals A, B, C, D, E, F, G is identified over the time period. The analysis takes place based on all the individual voice data ESD and individual voice signals from the voice terminal A, B, C, D, E, F, G decoded therefrom. The communication system in FIG. 1 is shown here at a time when the voice terminals A, B and C have been identified as active and the voice terminals D, E, F and G have been determined to be inactive. Thus according to the nomenclature explained above individual voice data $ESD^A_A$, $ESD^A_B$, $ESD^A_C$ arrives for the active voice terminals A, B, C. Individual voice data $ESD^P_D$, $ESD^P_E$, $ESD^P_F$ and $ESD^P_G$ also arrives for the passive voice terminals D, E, F and G in the voice conference system KONF. The incoming individual voice data $ESD^A_A$, $ESD^A_B$, $ESD^A_C$ from the voice terminals A, B and C is decoded into individual voice signals and superimposed to form a common aggregate voice signal (not shown). In a further step this aggregate voice signal is coded into aggregate voice data. Because of the superimposition by the signals of the voice terminals A, B and C this aggregate voice data is shown as $SSD_{ABC}$ and transmitted to the passive voice terminals D, E, F, G, in other words those characterized by further inactivity at their respective recording channels, as output data streams. The same aggregate voice data $SSD_{ABC}$ is thus supplied to all the passive voice terminals D, E, F, G. The aggregate voice data $SSD_{ABC}$ received in the respective voice terminals D, E, F, G is then decoded in the respective voice terminals D, E, F, G and output for the respective participants by way of speakers in the telephone receivers.

Individual aggregate voice data SSD is also transmitted to the active voice terminals A, B, C. For the voice terminal A this is for example coded data of a terminal-specific superimposition of the individual voice signals of the voice terminal B and the voice terminal C. The coded superimposition of the individual voice signals from B and C is thus transmitted as aggregate voice data $SSD_{BC}$ to the voice terminal A. In a similar manner the individual voice signals of the other voice terminals are supplied, after being superimposed and then coded, to the further active voice terminals B and C respectively. For the voice terminal B this is the aggregate voice data $SSD_{AC}$ and for the voice terminal C the aggregate voice data $SSD_{AB}$, which is formed in a terminal-specific manner (for B and C) in each instance.

The respective voice terminals A, B, C, D, E, F, G are thus supplied with aggregate voice data SSD, which is provided after decoding to the respective voice terminals A, B, C, D, E, F, G for outputting by means of a speaker. The aggregate voice data SSD here contains the audio components of the voice conference required respectively for a subscriber in each instance. More extensive subsequent processing of voice signals or voice data—for example by means of superimposition, extraction and/or inversion of audio signals—in the respective voice terminals A, B, C, D, E, F, G is not required.

Determination of activity and inactivity (or passivity) has not been examined in more detail until now. Activity is characterized for example by a single instance of exceeding a signal over a threshold level. Alternatively it can be predetermined that a level has to be exceeded a number of times before the signal is classed as active. Mean and statistical evaluations can also be included in the activity assessment. Regular or irregular time periods can be investigated; additionally or alternatively values above or below threshold values can trigger a new assessment in respect of activity.

Figure 2:
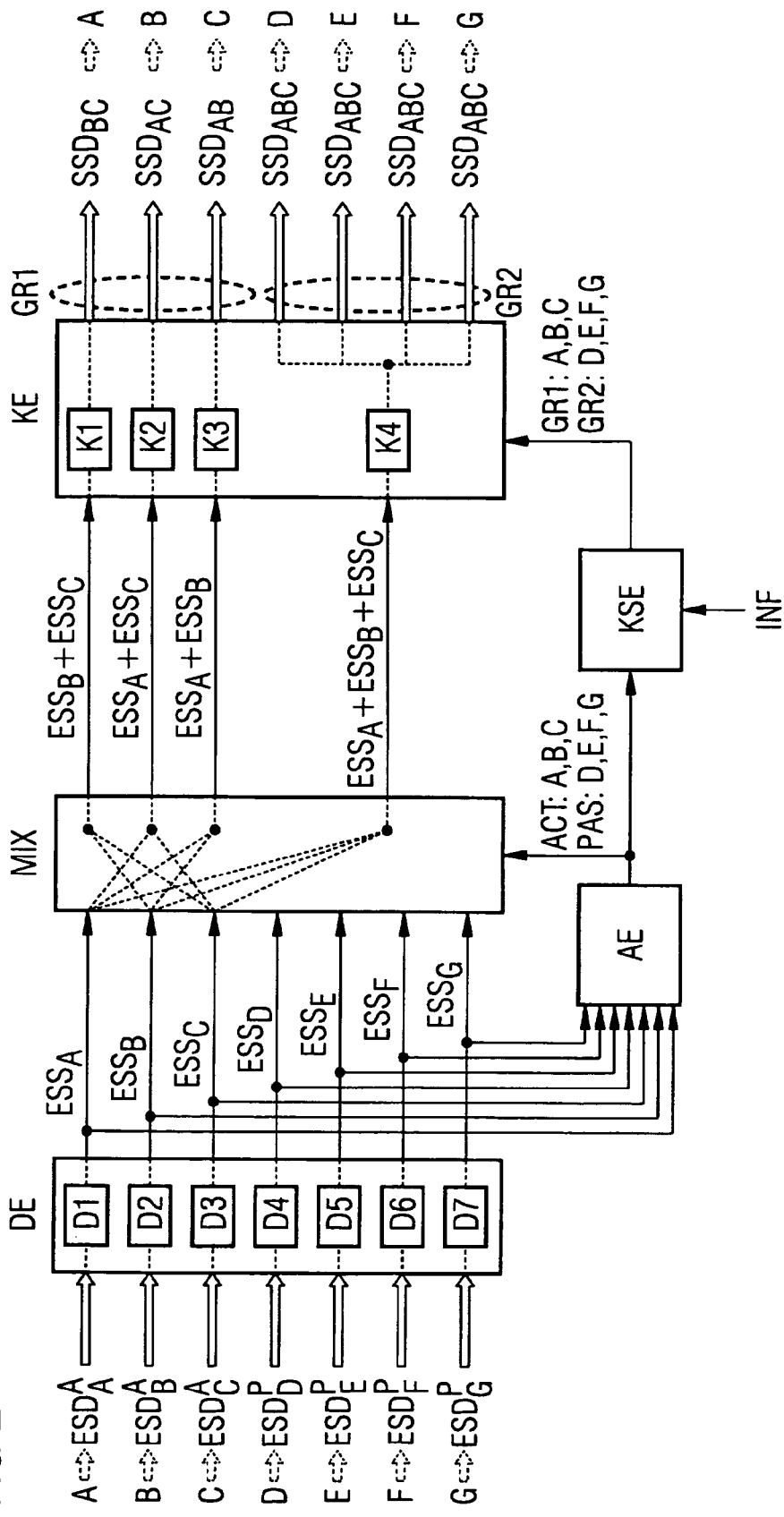
Figure 3:
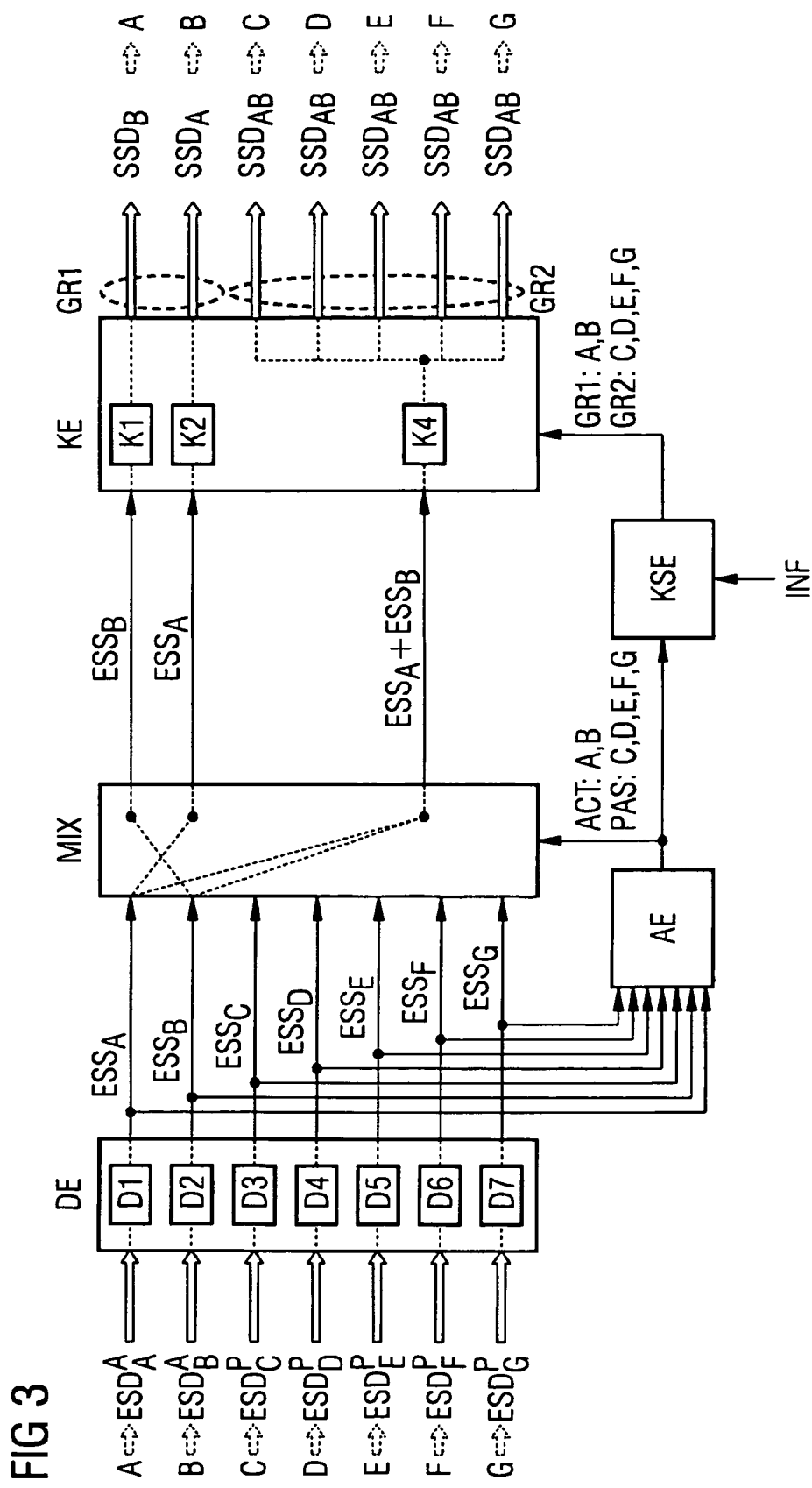
Figure 4:
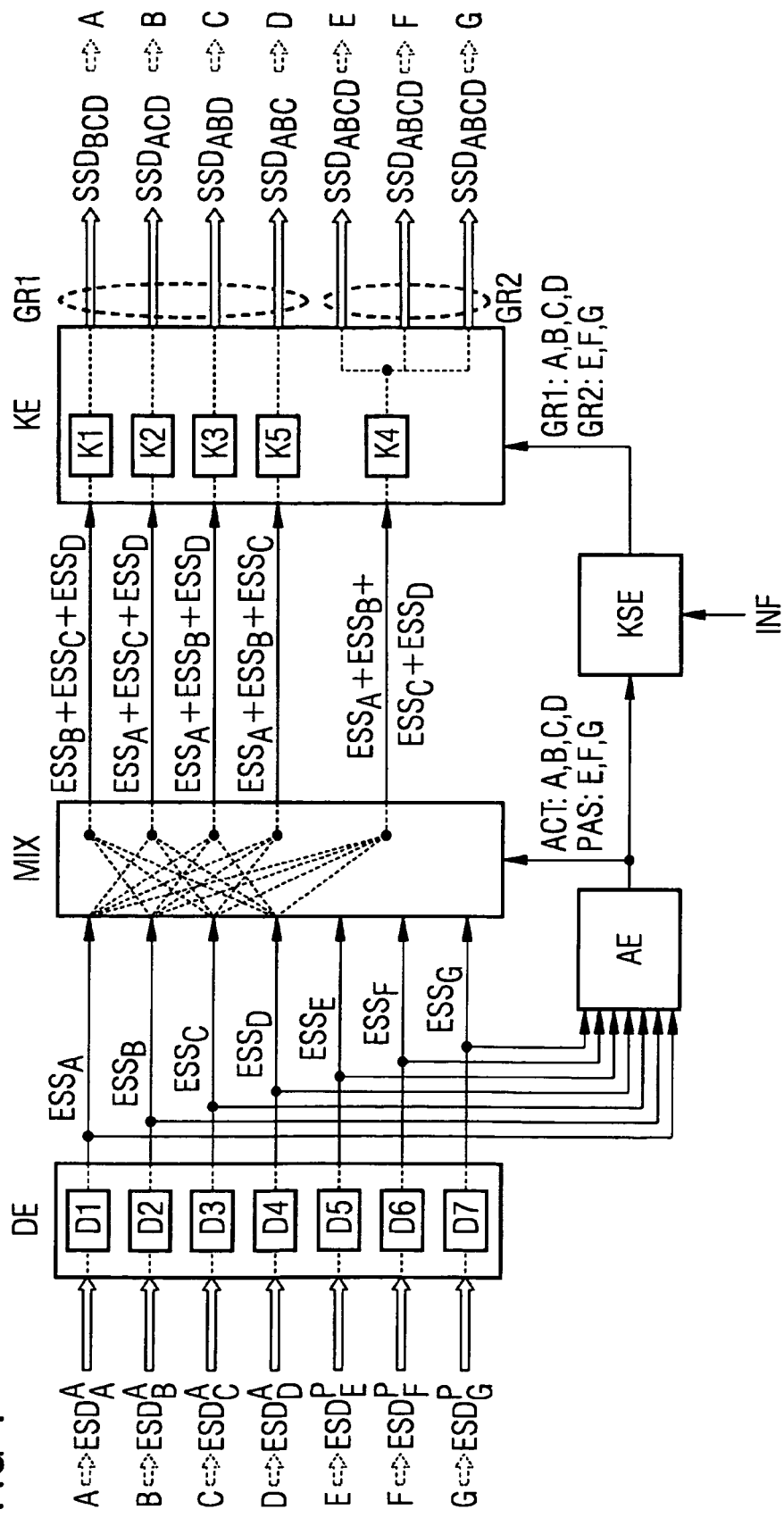

Now that the rough relationships have been explained in respect of carrying out a voice conference in FIG. 1, FIG. 2 and the further FIGS. 3-5 are used to describe how the voice conference system KONF carries out the analysis of the voice data and the processing of the voice signals and voice data. In FIG. 2 the initial situation is identical to the situation in FIG. 1; in other words the voice terminals A, B and C are active and the voice terminals D, E, F and G are inactive. The designations introduced in FIG. 1 for the individual voice data ESD, the aggregate voice data SSD—including the superscript and subscript designations—of the groups GR1, GR2 and the voice terminals A, B, C, D, E, F, G are also retained in FIGS. 2 to 5.

In FIGS. 2 to 5 the voice conference system KONF is segmented into a decoding unit DE, a signal mixing unit MIX, a coding unit KE, an activity identification unit AE and a coding control unit KSE. The signal flow in these figures goes from left to right, so that individual voice data ESD arriving at the voice conference system KONF from the voice terminals A, B, C, D, E, F, G is shown on the left and aggregate voice data SSD output by the voice conference system KONF to the respective voice terminals A, B, C, D, E, F is shown on the right of the respective FIGS. 2 to 5. The decoding unit DE is shown as a rectangle containing a number of decoders D1 to D7, also shown as rectangles. The decoders D1 to D7 here are decoder entities of CODECs, for example a G.723 or a G.729 CODEC. Input information for the decoding unit DE is data packets of the individual voice data $ESD^A_A$, $ESD^A_B$, $ESD^A_C$, $ESD^P_D$, $ESD^P_E$, $ESD^P_F$, $ESD^P_G$ of the voice terminals A, B, C, D, E, F, G. To distinguish packet-oriented coded data from uncoded voice signals, the data or data packets are shown using double arrows in FIGS. 2 to 5, while signals (and also control data) are shown as single arrows.

The decoders D1 to D7 of the decoding unit DE have as their output a signal output for transmitting individual voice signals ESS to the signal mixing unit MIX. In the signal mixing unit MIX different, superimposed mixed signals are formed as aggregate voice signals from the incoming individual voice signals ESS, which are in turn transmitted to the coding unit KE. These mixed signals (shown in the figure as an addition of individual voice signals—e.g. $ESS_B+ESS_A$) or aggregate voice signals are coded by coding entities K1 to K6 of respective CODECs into aggregate voice data SSD and transmitted to the respective voice terminals A to G.

The activation identification unit AE (which can also be referred to as the signal mixing control unit) is supplied with all the individual voice signals $ESS_A$, $ESS_B$, $ESS_C$, $ESS_D$, $ESS_E$, $ESS_F$, $ESS_G$ output by way of the decoding unit DE. Alternatively the individual voice data $ESD^A_A$, $ESD^A_B$, $ESD^A_C$, $ESD^P_D$, $ESD^P_E$, $ESD^P_F$, $ESD^P_G$ can be processed by the activation identification unit AE before it is supplied to the decoding unit DE. The activation identification unit AE determines the active and passive voice terminals for a certain time segment. This determined information is then supplied to the signal mixing unit MIX and the coding control unit KSE—in a signaling not specified in more detail in the context of the exemplary embodiment—so that the activation identification unit AE not only identifies activity and passivity but also carries out functions for controlling the mixing of signals. The supplied information is used in the signal mixing unit MIX to control and carry out the mixing of the different individual voice signals $ESS_A$, $ESS_B$, $ESS_C$, $ESS_D$, $ESS_E$, $ESS_F$, $ESS_G$.

The information and further information INF relating to the CODECs of the voice terminals A to G is also transmitted to the coding control unit KSE. The coding control unit KSE then determines the group assignment of the voice terminals A to G. The determined group membership is shown here in FIGS. 2 to 5 by means of ellipses with broken lines at the outputs of the coding unit KE. The signal path within the decoding unit DE, the signal mixing unit MIX and the coding unit KE is also shown by broken lines.

In FIG. 2 the individual voice data $ESD^A_A$, $ESD^A_B$, $ESD^A_C$ of the active voice terminals A, B and C is supplied to the decoding unit DE according to the diagrams in FIG. 1. The inactive individual voice data $ESD^P_D$, $ESD^P_E$, $ESD^P_F$, $ESD^P_G$ of the voice terminals D, E, F and G is likewise supplied to the decoding unit DE. Decoding takes place here individually by means of respective decoders D1 to D7. The decoders D1 to D7 generate the respective individual voice signals $ESS_A$, $ESS_B$, $ESS_C$ as well as $ESS_D$, $ESS_E$, $ESS_F$ and $ESS_G$. These said individual voice signals ESS are supplied to the signal mixing unit MIX and the activation identification unit AE.

The activation identification unit AE analyzes these individual voice signals ESS and identifies that the voice terminals A, B and C are characterized by extensive activity while the voice terminals D, E, F and G are characterized by extensive inactivity. This is transmitted to the signal mixing unit MIX by means of one or more information messages. This is shown in FIG. 2 by the message ACT and/or PAS, the message ACT comprising the list of active voice terminals A, B, C and the message PAS comprising a list of passive voice terminals D, E, F and G. This signal mixing unit MIX processes these messages and then superimposes two of the three active voice terminal signals $ESS_A$, $ESS_B$, $ESS_C$ respectively to form a respective aggregate voice signal from two of the three voice terminals A, B, C respectively and to form a superimposition of all three voice terminal signals $ESS_A$, $ESS_B$, $ESS_C$. A superimposition of the signals from the voice terminals B and C—shown in FIG. 2 as $ESS_B+ESS_C$—is provided here for outputting at the voice terminal A and also has to be transmitted to the coding unit KE for this purpose. Similarly for the voice terminal B there is a superimposition of the individual voice signals from the voice terminals A and C–$ESS_A+ESS_C$—and for the voice terminal C a superimposition of the individual voice signals from the voice terminals A and B–$ESS_A+ESS_B$. All three active voice terminal signals $ESS_A+ESS_B+ESS_C$ are also superimposed and likewise supplied to the coding unit KE.

The coding control unit KSE receives the messages relating to active (A, B, C) and inactive (D, E, F, G) voice terminals and also enquires—shown by the supply of information INF—which CODECs are supported by which voice terminals A, B, C, D, E, F, G. Based on this information it is now possible for the coding control unit KSE to organize voice terminals A, B, C, D, E, F, G into groups, so that all the active voice terminals (i.e. A, B, C) are contained in a first group GR1 and all the passive voice terminals (i.e. D, E, F, G) are combined in a second group GR2. This assumes that all the passive voice terminals D, E, F and G respectively support a common CODEC, so that the subsequent coding can be decoded again at the voice terminals D, E, F and G.

This group information is transmitted from the coding control unit KSE to the coding unit KE (shown in FIG. 2 as messages "GR1: A, B, C" and "GR2: D, E, F, G"). The coding unit KE then respectively generates an entity of a coder (or retrieves an entity from a predetermined pool of coders) for the active voice terminals A, B, C assigned to the first group GR1 and a common entity for all the voice terminals D, E, F, G assigned to the second group GR2. The first-mentioned are the coders K1, K2 and K3 in FIG. 2. The common coder for the inactive voice terminals D, E, F, G is shown as K4 in FIG. 2. The coder K1 codes the aggregate voice data $SSD_{BC}$ intended for the voice terminal A by coding the superimposed individual voice signals $ESS_B$ and $ESS_C$. The superimposed individual voice signals $ESS_A+ESS_B$ from the voice terminals A and C are processed in a similar manner by the coder K2 and forwarded to the voice terminal B by means of the aggregate voice data $SSD_{AC}$. The superimposed individual voice data $ESS_A$ and $ESS_B$ from the voice terminals A and B is coded correspondingly by the coder K3 and supplied as aggregate voice data $SSD_{AB}$ to the voice terminal C.

The coder K4 processes the superimposed signals from the three active voice terminals A, B and C, i.e. $ESS_A+ESS_B+ESS_C$. Common aggregate voice data $SSD_{ABC}$ is generated by the coder K4 and this is reproduced and transmitted by way of the respective connections to the inactive voice terminals D, E, F and G.

This means that only one coder K4 is required for the inactive voice terminals D, E, F and G, generating the aggregate voice data $SSD_{ABC}$ to be supplied in a common manner for all four inactive voice terminals D, E, F, G. It is thus possible to use a number of coders less than in the prior art. This logical combining of inactive voice terminals is shown in FIG. 2 by an ellipse marked GR2, which encloses the aggregate voice data $SSD_{ABC}$ for the voice terminals D, E, F and G.

Based on the configuration of and situation shown in FIG. 2, in FIG. 3 the hitherto active voice terminal C becomes inactive, in that a participant associated with it does not generate a voice signal, which would be identified as an active voice signal, over a certain time period. It is determined by means of the activity identification unit AE that only the voice terminals A and B are now active, while the voice terminals C, D, E, F and G are inactive. This is transmitted to the signal mixing unit MIX by means of the messages ACT and PAS. The signal mixing unit MIX then forms a mixed signal from the two active voice terminals A and B–$ESS_A+ESS_B$. The signal mixing unit MIX of a respective active voice terminal would also generate a mixed signal from the remaining voice terminals. Since in this instance only two active voice terminals A and B are present, superimposition while generating a mixed signal is not necessary. Only the individual voice signal $ESS_B$ from the voice terminal B is made available to the voice terminal A and conversely the individual voice signal $ESS_A$ from the voice terminal A is made available to the voice terminal B. The two last-mentioned individual voice signals $ESS_A$ and $ESS_B$ are coded into aggregate voice data $SSD_B$ and $SSD_A$ by the coders K1 and K2 and transmitted to the voice terminals A and/or B in such a manner that the aggregate voice data $SSD_B$ transmitted to voice terminal A simply represents a coding of the individual voice signals $ESS_B$ from the voice terminal B. Similarly only the voice data from the voice terminal A is supplied to the voice terminal B.

The superimposed aggregate voice signals $ESS_A+ESS_B$ from the two active voice terminals A and B correspond to the aggregate voice signal, which is now converted by means of the coder K4 into the first aggregate voice data $SSD_{AB}$. This converted aggregate voice data $SSD_{AB}$ is now duplicated to the various connections V and supplied to the respective inactive voice terminals C to G. This takes place based on control by the coding control unit KSE, which has identified that the first group GR1 of active voice terminals only comprises the voice terminals A and B, while the second group GR2 of inactive voice terminals comprises the voice terminals C, D, E, F and G. This is shown again by an ellipse marked GR2 in FIG. 3.

It is clear from FIGS. 2 and 3 that in a voice conference in which generally only one main speaker and a number of secondary speakers are temporarily present simultaneously, the method allows the number of coders deployed to be significantly reduced. In an optimum extreme instance this can mean that only two coders have to be deployed in order to be able to serve all the voice terminals in the voice conference.

FIG. 4 now shows a converse approach based on FIG. 2, in that a hitherto passive member of the voice conference—voice terminal D—is characterized by activity at its respective recording channel and is therefore assigned to the group GR1 of active voice terminals. The voice terminals A to D are now largely active and all the voice terminals A to G are sorted or grouped into active and passive voice terminals by the activity identification unit AE according to their activity. This grouping information is again transmitted to the signal mixing unit MIX. As in the previous FIGS. 2 and 3 this respectively forms a number of mixed signals. There is one mixed signal each for the active voice terminals A, B, C and D and a common mixed signal for the passive voice terminals E, F and G. The last-mentioned mixed signal here is a superimposition of the individual voice signals $ESS_A+ESS_B+ESS_C+ESS_D$ of the four active voice terminals A, B, C and D. The coding control unit KSE now carries out a grouping into the first and second groups GR1 and GR2 based on their activity plus information relating to the supported CODECs, so that the active voice terminals A, B, C and D are combined in the first group GR1 and the inactive voice terminals E, F and G are combined in the second group GR2.

As in FIG. 2 the coders K1, K2, K3 and K4 are also used to generate the signals for the voice terminals A, B, C, E, F and G. To generate the aggregate voice data $SSD_{ABC}$ for the voice terminal D which was hitherto inactive but has now been activated, a new coding entity K5 is generated in the coding unit KE to code the incoming superimposed aggregate voice signals $ESS_A+ESS_B+ESS_C$ from the voice terminals A, B and C and transmit them as aggregate voice data $SSD_{ABC}$ to the voice terminal D. This dynamic adding of coders means that it is possible to respond in a flexible manner to activity changes at the respective recording channels of the voice terminals. The aggregate voice data $SSD_{ABCD}$ generated by the coder K4 is supplied only to the still inactive voice terminals E, F and G in contrast to FIG. 2.

In FIG. 5 the method is extended so that not all the voice terminals support a corresponding set of CODECs. It is assumed here that the terminals D and E respectively support a common CODEC with extremely high voice quality, while the voice terminals F and G only support a CODEC with average voice quality. The said voice terminals D, E, F and G are characterized by their inactivity as in FIG. 2. The voice terminals A, B and C are active as in FIG. 2. The activation identification unit AE thus identifies, as in FIG. 2, that the voice terminals A, B, C are active and the voice terminals D, E, F and G are inactive and transmits this information to the signal mixing unit MIX and to the coding control unit KSE. As shown in FIG. 2, the signal mixing unit MIX generates mixed signals for the active voice terminals A, B, C and a common superimposed aggregate voice signal $ESS_A+ESS_B+ESS_C$ for all the passive voice terminals D, E, F and G. The coding control unit KSE analyzes the transmitted information in respect of activity and passivity together with information INF relating to the CODECs supported by the voice terminals A to G and then groups the voice terminals A to G according to their activity and CODEC support into three groups GR1, GR2 and GR3. GR1 comprises the active voice terminals A, B and C. GR2 comprises the inactive voice terminals which support the best possible CODEC. In the exemplary embodiment this is just the voice terminals D and E. The coding control unit KSE also groups into the group GR3 those inactive voice terminals which are inactive but do not support the maximum coding quality. These are the voice terminals F and G.

The coding unit KE then generates a coder K1, K2 and K3 respectively for the voice terminals A, B, C of the first group GR1. A coding entity K4 is generated for the group GR2 and a coding entity K6 for the third group GR3, with the superimposed aggregate voice signal $ESS_A+ESS_B+ESS_C$ being supplied to the three active voice terminals A, B, C with the two last-mentioned coders. The coder K4 now converts this supplied aggregate voice signal into specific first aggregate voice data $SSD^{K4}_{ABC}$ for this coder and supplies this first aggregate voice data $SSD^{K4}_{ABC}$ to the voice terminals D and E. The coder K5 also generates second aggregate voice data $SSD^{K6}_{ABC}$, likewise from the same aggregate voice signals, which are also supplied to the fourth coder K4. The coder K6 thus generates coder-specific aggregate voice data $SSD^{K6}_{ABC}$, which is then supplied to the two inactive voice terminals F and G. The method thus allows a clear reduction in the number of coders to be deployed in the coding unit KE even with non-homogenous CODEC support, without having to have recourse to a sub-optimum coder, even though individual voice terminals would support a better quality coder.

The method can be extended in a similar manner to a number of groups of inactive voice terminals, so that optimum coding takes place for voice terminals of a respective group according to certain criteria, with possible optimization criteria being described in the next paragraph.

While the grouping into second and third groups GR2, GR3 has taken place above largely according to quality criteria for the coding to be carried out (and thus according to the voice quality to be achieved), coder selection can also take place according to other adaptive criteria or a combination of different criteria. Consideration can thus be given to forming as few groups as possible. Alternatively one criterion can be that a very large number of voice terminals is assigned to at least one of the groups GR2, GR3. In so far as an arbitrary number of coders is not available and only a limited number of entities can be generated for a specific CODEC type, a further criterion can be that of generating as few entities as possible of one CODEC type. The anticipated computation outlay for coding can also be included in the coder selection so that the computation outlay in the voice conference server is kept low or minimized. The transmission bandwidth for generated aggregate voice data can also be considered, so that over-utilization of the connections to the voice terminals does not result. One criterion that should be considered in conjunction with one or more of the criteria mentioned above is that a number of coders deployed simultaneously over all the voice conferences taking place simultaneously is minimized.

Coder selection can preferably take place according to combined quality and quantity criteria, so that for example the best quality CODEC supported by at least one further voice terminal or supported by a predetermined minimum number of further voice terminals is to be preferred as the main criterion. For such optimization therefore the absolute optimum may not be selected for each criterion, with an overall optimum being determined—for example by evaluating the individual criteria—and the coder being selected according to this overall optimum. Preferably therefore determination of the groups GR2, GR3 and optionally further groups is carried out together with the determination of the coders to be used, as both influence each other and feed back to each other.

Provided that during voice conferences only a few participants participate simultaneously in an active manner in the voice conference, the method allows a clear reduction to be achieved in computation outlay in the coding unit KE. The analysis relating to activity and inactivity can be carried out adaptively here, so that, for example when a voice channel is characterized by a very significant increase in active voice data flow, the activity threshold is changed in such a manner that only two or maximum three voice terminals are grouped as active voice terminals. This means that voice confusion from a large number of active voice terminals never results, which probably none of the participants at the voice terminals could follow. The method therefore also serves to streamline voice conferences and enhance voice comprehensibility and voice clarity.

To allow interference-free activation and deactivation of coding in the coding unit, it may be expedient to switch a signal to and fro only between coders based on the same CODEC. For example an active signal, which was hitherto coded by the G.723 CODEC, can be assigned when it switches to inactive to a group of inactive voice terminals, which also use this CODEC G.723. This means that the switching of coders in the coding unit KE is transparent to the voice terminal. Information to the respective voice terminal from the coding unit KE is not absolutely necessary.

Alternatively there could also be provision for a switch to a different method in the event of a coder change. However a corresponding signaling to the voice terminal would then also be expedient, signaling a switch to the new CODEC, so that the voice terminal is instructed likewise to switch to the appropriate CODEC.

The method is particularly advantageous, when a number of conferences are carried out simultaneously in a voice communication system, since this significantly increases the number of coders to be saved. The number of decoders is not reduced but this is not disadvantageous, as the computation outlay of the coding unit KE clearly exceeds the computation outlay of the decoding unit DE.

A wide range of methods can be used for identifying activity and/or inactivity. For example it is possible to determine a maximum signal over a certain time segment and compare it with a threshold value. A mean signal level can also be determined and compared with threshold values. It is also advantageous to identify a change in signal levels or a trend, so that even in the case of a slight increase in signal level it can already be identified that important information is transmitted very briefly by way of a recording channel, so this recording channel is to be activated. It is also advantageous in particular if the switch between activity and inactivity does not bring about a clear change in group membership in every time segment, as this may be disadvantageous in respect of the generated voice quality. It is therefore expedient to include a hysteresis or threshold value switch, so that the activity or inactivity is only identified if the signal is above or below a comparison value for quite a long time period. A number of threshold values can also be defined, so that a switch into the one group may be quicker than a switch in the other direction. This makes it possible to take account of the fact that pauses occur in speech even in for active participants and these should not result immediately in a switch to the inactive group.

Although reference is made to voice terminals for description purposes, the invention can also be used generally for multimedia connections or video connections. The proposed principles can also be applied to line-oriented communication systems. Voice terminals are preferably telephones but they can also be software applications on a workstation computer, frequently also referred to as soft clients. The voice conference system can be a central facility of a communication system, with a decentralized architecture also being possible, with server-side signal mixing and coding—whether centralized or decentralized—in particular allowing less complexity in the terminals.

The invention claimed is:
1. A method of carrying out a voice conference comprising:
   establishing a conference call between a plurality of voice terminals, the voice terminals comprising a first voice terminal, a second voice terminal, a third voice terminal, a fourth voice terminal and a fifth voice terminal;

a voice conference system analyzing incoming voice data from each of the voice terminals for transmitting to the other voice terminals;

the voice conference system determining that at least the first voice terminal and the second voice terminal are inactive over a predetermined time period during the conference call and grouping the first and second voice terminals in a first group of terminals;

the voice conference system determining that at least the third voice terminal and the fourth voice terminal are active over the predetermined time period and grouping the third and fourth voice terminals in a second group of terminals;

the voice conference system receiving incoming voice data from the third and fourth voice terminals and superimposing the voice data from the third voice terminal with the voice data from the fourth voice terminal to form a first aggregate voice signal;

the voice conference system sending a second aggregate voice signal comprising the voice data of the fourth voice terminal to the third voice terminal;

the voice conference system sending a third aggregate voice signal comprising the voice data of the third voice terminal to the fourth voice terminal; and the voice conference system sending the first aggregate voice signal to the first and second voice terminals;

the voice conference system determining that the fifth voice terminal is active over the predetermined time period and grouping the fifth voice terminal in the second group of terminals;

the voice conference system receiving incoming voice data from the fifth voice terminal and superimposing the voice data from the fifth voice terminal with the voice data from the third voice terminal and the voice data from the fourth voice terminal to form the first aggregate voice signal;

the voice conference system superimposing the voice data from the fifth voice terminal with the voice data from the fourth voice terminal to form the second aggregate voice signal;

the voice conference system superimposing the voice data from the third voice terminal with the voice data from the fifth voice terminal to form the third aggregate voice signal;

the voice conference system superimposing the voice data from the third and fourth voice terminals to form a fourth aggregate voice data;

the voice conference system sending the fourth aggregate voice signal to the fifth voice terminal; and wherein the voice conference system comprises a plurality of decoders, an activation identification unit, a plurality of coders, a coding control unit, and a signal mixing unit;

the decoders decoding data from the voice terminals to transmit the voice data from the voice terminals to the activation identification unit and the signal mixing unit, the activation identification unit determining that at least the first voice terminal and the second voice terminal are inactive over the predetermined time period during the conference call and determining that at least the third, fourth and fifth voice terminals are active over the predetermined time period;

the coding control unit grouping the third, fourth and fifth voice terminals in the second group of terminals based upon the determination that at least the third, fourth and fifth voice terminals were active made by the activation identification unit and grouping the first and second voice terminals in the first group of terminals based upon the determination that at least the first and second voice terminals are inactive over the predetermined time period made by the activation unit;

the coding control unit assigning a first coder of the coders to the voice terminals of the first group;

the coding control unit assigning a second coder of the coders to the third voice terminal;

the coding control unit assigning a third coder of the coders to the fourth voice terminal;

the coding control unit assigning a fourth coder of the coders to the fifth voice terminal;

the signal mixing control unit receiving the decoded data from the decoders and forming the first, second, third and fourth aggregate voice signals for sending to the voice terminals based upon the active and inactive determinations made by the activation identification unit, the first coder of the coders encoding the first aggregate voice signal for transmitting to the first and second voice terminals;

the second coder of the coders encoding the second aggregate voice signal for transmitting to the third voice terminal;

the third coder of the coders encoding the third aggregate voice signal for transmitting to the fourth voice terminal; and the fourth coder of the coders encoding the fourth aggregate voice signal for transmitting to the fifth voice terminal.

2. The method of claim 1 further comprising:
reforming the first group after the end of a time segment or by identifying a change in activity at a recording channel of at least one of the voice terminals of the first group of terminals or by identifying input provided via a user action from at least one of the first voice terminal and the second voice terminal.

3. The method of claim 1 further comprising:
reforming the second group after the end of a time segment or by identifying a change in activity at a recording channel of at least one of the voice terminals of the second group of terminals or by identifying input provided via a user action from at least one of the third voice terminal and the fourth voice terminal.

4. The method of claim 1 wherein the predetermined time period during the conference call is a first predetermined time period, the method further comprising:
the voice conference system determining that at least the second voice terminal, the third voice terminal and the fourth voice terminal are active over a second predetermined time period and adding the second voice terminal to the second group of terminals;

the voice conference system determining that at least the first voice terminal and the fifth voice terminal of the voice terminals is inactive over a second predetermined time period during the conference call that occurs after the first predetermined time period and grouping the first voice terminal and the fifth voice terminal in the first group of terminals and removing the second voice terminal from the first group of terminals and removing the fifth voice terminal from the second group of terminals;

the voice conference system receiving incoming subsequent voice data from the second, third and fourth voice terminals after adding the second voice terminal to the second group of terminals and superimposing the subsequent voice data from the second voice terminal, with the subsequent voice data from the third voice terminal and with the subsequent voice data from the fourth voice terminal to form a fifth aggregate voice signal;

the voice conference system superimposing the subsequent voice data from the third voice terminal with the subsequent voice data from the fourth voice terminal to form a sixth aggregate voice signal;

the voice conference system superimposing the subsequent voice data from the second voice terminal with the subsequent voice data from the fourth voice terminal to form a seventh aggregate voice signal;

the voice conference system superimposing the subsequent voice data from the second voice terminal with the subsequent voice data from the third voice terminal to form an eighth aggregate voice signal;

the voice conference system sending the fifth aggregate voice signal to the first voice terminal and the fifth voice terminal;

the voice conference system sending the sixth aggregate voice signal to the second voice terminal;

the voice conference system sending the seventh aggregate voice signal to the third voice terminal; and the voice conference system sending the eighth aggregate voice signal to the fourth voice terminal.

5. The method of claim 1 wherein the first aggregate voice signal is coded by just one first coder prior to the voice conference system sending the first aggregate voice signal.

6. The method of claim 5 wherein the second aggregate voice signal is coded by just one second coder, which is different from the first coder.

7. The method of claim 1 wherein a coder selection for coding voice signals for sending the voice signals takes place adaptively.

8. The method of claim 7 wherein the adaptive selection of a coder takes place such that output quality at voice terminals is optimized.

9. The method of claim 7 wherein the adaptive selection of the coder takes place such that a transmission bandwidth at a receive channel of at least one of the voice terminals is optimized.

10. The method of claim 7 wherein the adaptive selection of the coder takes place such that a number of coders deployed simultaneously for the conference call is minimized.

11. The method of claim 1 further comprising:
identifying inactivity of a voice terminal assigned to the second group for a predetermined period of time;
cancelling the assigning of the identified inactive voice terminal to the second group; and
assigning the identified inactive voice terminal to the first group.

12. The method of claim 1 further comprising:
identifying inactivity of a voice terminal assigned to the second group and characterizing as available a coder hitherto assigned to transmit voice data to this identified inactive voice terminal that was assigned to the second group.

13. The method of claim 1 further comprising:
identifying activity of a voice terminal assigned to the first group for a predetermined period of time that is above a threshold;
cancelling the assignment of the identified active voice terminal to the first group; and
assigning the identified active voice terminal to the second group.

14. The method of claim 13 further comprising:
forming a terminal-specific aggregate voice signal for the identified active voice terminal;
assigning a coder characterized as available to the identified active voice terminal; and
coding by the coder the terminal-specific aggregate voice signal for the identified active voice terminal into aggregate voice data specifically for the active voice terminal.

15. A voice conference system for a plurality of voice terminals in a communication system comprising:
a decoding unit that decodes voice data received from the voice terminals;
an activation identification unit communicatively connected to the decoding unit to receive the decoded voice data from the decoding unit, the activation unit analyzing the decoded voice data to determine which of the voice terminals are active and which of the voice terminals are inactive for a predetermined period of time, the active voice terminals being determined by those voice terminals having activity occurring at a recoding channel of those voice terminals based upon the activity being above a threshold, the threshold based upon a frequency or duration of activity, the inactive voice terminals being determining by the decoded voice data indicating that those terminals have activity at recording channels of those voice terminals that is below the threshold;
a coding control unit communicatively connected to the activation identification unit and a coding unit, the coding control unit determining at least one first group of inactive voice terminals of the voice terminals based upon data received from the activation identification unit that identifies which of the voice terminals are inactive, the coding control unit determining a second group of active voice terminals of the voice terminals based upon data received from the activation identification unit that identifies which of the voice terminals are active, the coding control unit determining which of the inactive voice terminals supports a first codec for assigning a first coder of the coding unit to those inactive voice terminals, upon a determination that at least one of the inactive voice terminals does not support a first codec, the coding control unit assigning that at least one inactive voice terminal to a second coder of the coding unit, the coding control unit assigning a plurality of third coders of the coding unit to the active voice terminals such that each of the third coders of the coding unit is assigned to a respective one of the active voice terminals;
a signal mixing unit that is communicatively connected to the activation identification unit to receive data indicating which of the voice terminals is active and which of the voice terminals is inactive, the signal mixing unit also communicatively connected to the decoding unit to receive the decoded voice data, the signal mixing unit mixing the decoded voice data into different aggregate voice data for the voice terminals based upon the received data indicating which of the voice terminals is active and which of the voice terminals is inactive so that all the inactive voice terminals receive a first aggregate voice data that includes voice data from all the active voice terminals that have been superimposed to form the first aggregate voice data for the inactive voice terminals;
the coding unit receiving the different aggregate voice data for the voice terminals from the signal mixing unit and encodes that data for transmission to the voice terminals, the first coder of the coding unit coding the first aggregate voice data for sending to all the inactive voice terminals to which that first coder is assigned, the second coder coding the first aggregate voice data for sending to all the inactive voice terminals to which that second coder is assigned; each of the third coders coding other aggregate voice data from the signal mixing unit for sending to the active voice terminal to which that third coder is assigned such that each of the third coders codes an aggregate voice data mixed for the respective one of the active voice terminals to which that third coder is assigned for sending to that respective one of the active voice terminals.

16. The voice conference system of claim 15 wherein the at least one first group is comprised of multiple groups that each has multiple voice terminals assigned therein via the coding control unit.

* * * * *